Dec. 7, 1937. W. GEGENHEIMER 2,101,172
SPROCKET CHAIN TRUING DEVICE
Filed Aug. 26, 1936
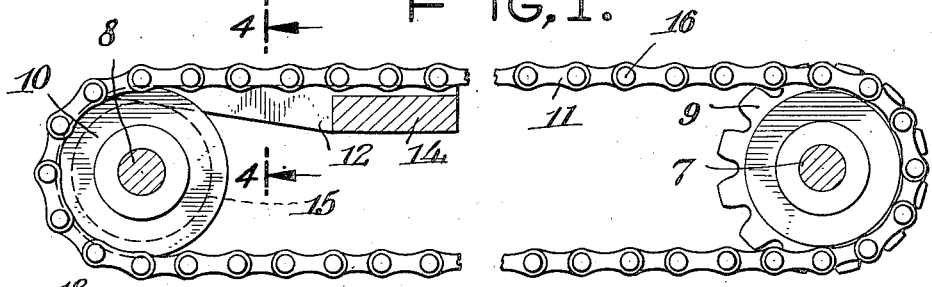
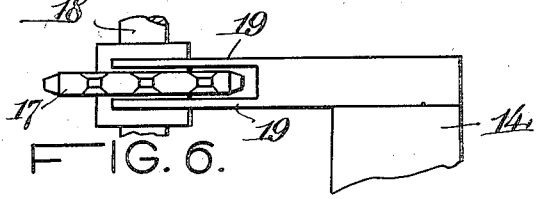
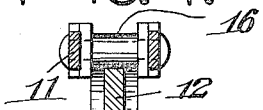
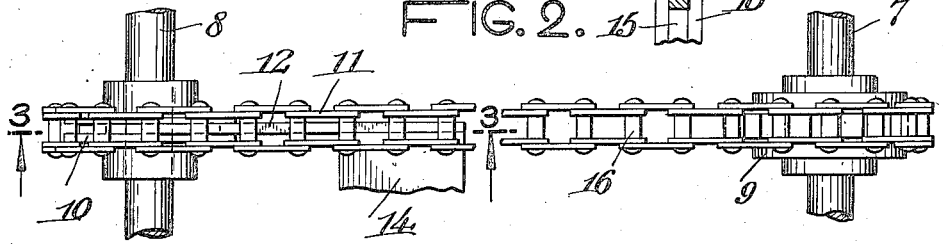
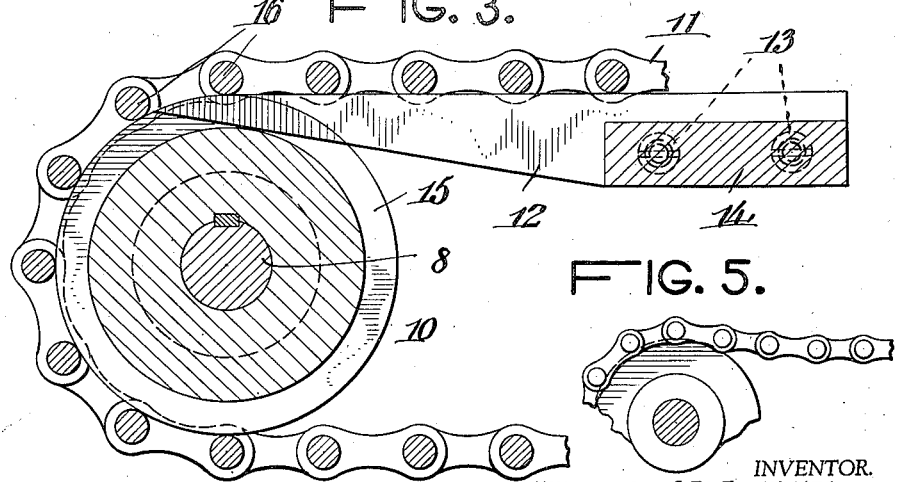
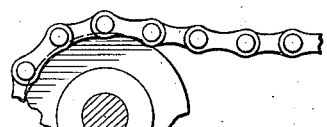
INVENTOR.
WILLIAM GEGENHEIMER,
BY
ATTORNEY.

Patented Dec. 7, 1937

2,101,172

UNITED STATES PATENT OFFICE 2,101,172

SPROCKET CHAIN TRUING DEVICE

William Gegenheimer, Brooklyn, N. Y., assignor to Willard Manufacturing Corporation, New York, N. Y., a corporation of New York Application August 26, 1936, Serial No. 98,092

3 Claims. (Cl. 74—240)

This invention relates to means for truing or compensating for the slack in sprocket chains.

The invention is adapted particularly for use in connection with printing machinery, and wherein chains are employed as conveyors for gripper bars to carry the paper at the delivery end of a lithograph or printing press. While the invention is especially useful in connection with such machinery, it will be understood that it is not necessarily restricted to such use but is capable of general application.

The primary object of the invention is to provide means of simplified and improved construction for truing the chain as it passes from the sprocket or idler to the power wheel, preventing the chatter and friction usually encountered as the chain leaves the idler.

A further object is to provide means whereby the upper or power flight or reach of the chain may be maintained in a true and undeviating line, thus minimizing friction and chatter and preventing sag of the chain flight.

With these objects in view, together with others which will appear as the description proceeds, the invention consists in the novel construction, combination and arrangement of parts, all as will be described more fully hereinafter, illustrated in the drawing and particularly pointed out in the claims.

In the drawing:

Figure 1 is a sectional view taken through spaced sprocket shafts and illustrating in side elevation the sprocket, idler and chain with a truing device employing the invention associated therewith, Figure 2 is a plan view of the chain and sprocket, Figure 3 is an enlarged sectional view taken substantially upon line 3—3 of Figure 2, Figure 4 is a transverse sectional view taken upon line 4—4 of Figure 1, Figure 5 is a fragmentary elevation illustrating the course usually assumed by a sprocket chain passing from the idler without a truing device, and Figure 6 is a plan view of a sprocket and slightly modified form of guard associated therewith.

Referring now more particularly to the drawing, 7 and 8 represent spaced conveyor shafts; the former in this instance constituting the power shaft and having a sprocket 9 secured thereto, while the shaft 8 constitutes the idler shaft and has an idler or roller 10 connected thereto. The endless chain 11 passes around the sprocket and idler as will be clearly understood. Sprockets and idlers with chains thus generally illustrated are commonly employed in connection with lithograph and printing machinery for the purpose of carrying the paper at the delivery end of the press, and these chains usually have associated therewith suitable gripper bars for engaging and holding the paper in its travel. However, as the grippers and the manner in which they operate form no part of the invention it has been deemed unnecessary to show and describe the same in the present application.

The preferred embodiment of the invention includes a guide illustrated more particularly and clearly in Figure 3, which guide includes a finger 12 secured at its rear end as by screws 13 to a rigid part of the frame 14 of the printing machine. This guide has a smooth and straight upper face and is located so that such face will be disposed in a straight line tangential to the power sprocket and idler at the upper reach or flight of the chain. The finger is narrow and capable of fitting between the spaced links of the conveyor chain so that the pins connecting said links will rest and freely slide upon the guide. This guide extends adjacent to the upper periphery of the idler 10 so that the links passing therefrom in their upper flight will move on to the guide and be supported thereon for a substantial period next following their leaving of the idler. In the accomplishment of this result, the idler 10 is provided with a circumferential channel 15 into which the reduced end of the finger 12 engages, in order that the extremity of the guide may pass beyond the vertical center of the shaft 8 supporting the idler. By this arrangement it is apparent that as the links successively pass around the idler the connecting pins or bolts 16 thereof engage and are guided upon the upper surface of the finger for a substantial distance. The guide thus obviates the possibility of the chain sag as is represented in Figure 5, and the finger so arranged eliminates the chatter as well as the retarding action of the chain incident to said chain sag.

While it is preferred that the idler or sprocket member be provided with a circumferential channel, the invention may equally as well be carried out in connection with a true sprocket wheel. In Figure 6 of the drawing there is shown a plan view of a sprocket wheel represented at 17 having the usual teeth and mounted upon the supporting shaft 18. The guide in this instance will include a yoke having parallel arms 19 to straddle the sprocket and to support the side links of the chain as it passes from the sprocket. In this form of the invention, it will be understood that the chain will rest upon its side links in traveling over the guide instead of upon the connecting pins or bolts as illustrated in the preferred embodiment of the invention.

From the foregoing it is obvious that the application of a guide such as described eliminates the chatter and noise incident to the sag usually encountered in the idler pulley of the conveyor mechanism, while the lifting of the chain from the idler preparatory to its making contact therewith materially reduces friction and thus economizes power.

What I claim is:

1. In a chain guide, a sprocket having an annular central groove in its periphery, a finger affixed adjacent to said sprocket and projecting into said groove, the said finger disposed tangentially to said sprocket.

2. In a chain guide, a shaft, an idler on said shaft having an annular central groove in its periphery, a finger supported adjacent to said idler and projecting into said groove, said finger having a straight supporting face tangent to the periphery of said idler.

3. In combination, spaced sprockets and a chain passing over the same, one of said sprockets having an annular central groove in its periphery, a fixed guide beneath the upper reach of the chain, said guide including a finger having its free end projected into said groove with its operative face tangent to the base circumference of the sprocket, the said operative face disposed between the side links of the chain.

WILLIAM GEGENHEIMER.